US 10,407,567 B2

(12) United States Patent
Esseghir et al.

(10) Patent No.: US 10,407,567 B2
(45) Date of Patent: Sep. 10, 2019

(54) FLOODING COMPOUNDS FOR TELECOMMUNICATION CABLES HAVING POLYMERIC FILLER AND BRANCHED OLEFINIC FLUID

(71) Applicant: Dow Global Technologies LLC, Midland, MI (US)

(72) Inventors: Mohamed Esseghir, Collegeville, PA (US); Yichi Zhang, Collegeville, PA (US); Brad C. Bailey, Midland, MI (US); Yi Jin, Missouri City, TX (US); Selim Yalvac, Pearland, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/557,627

(22) PCT Filed: Mar. 14, 2016

(86) PCT No.: PCT/US2016/022252
§ 371 (c)(1),
(2) Date: Sep. 12, 2017

(87) PCT Pub. No.: WO2016/160315
PCT Pub. Date: Oct. 6, 2016

(65) Prior Publication Data
US 2018/0066129 A1  Mar. 8, 2018

Related U.S. Application Data

(60) Provisional application No. 62/140,673, filed on Mar. 31, 2015.

(51) Int. Cl.
*C08L 23/06* (2006.01)
*G02B 6/44* (2006.01)
(Continued)

(52) U.S. Cl.
CPC ............ *C08L 23/06* (2013.01); *B01J 31/22* (2013.01); *C08L 23/0815* (2013.01);
(Continued)

(58) Field of Classification Search
CPC ............ C08L 2201/08; C08L 2205/02; C08L 2205/025; C08L 2207/324; C08L 23/06;
(Continued)

(56) References Cited

U.S. PATENT DOCUMENTS 4,356,342 A    10/1982  Verne
5,505,773 A *   4/1996  Vitands ............... C08L 23/18
                                                    106/285
(Continued)

FOREIGN PATENT DOCUMENTS

WO    2014209927 A1    12/2014
WO    2016/044975 A1    3/2016

OTHER PUBLICATIONS

PCT/US2016/022252, International Search Report and Written Opinion dated Jun. 6, 2016.
(Continued)

*Primary Examiner* — Andrew Jordan

(57) ABSTRACT

Flooding compounds for telecommunications cables. Such flooding compounds contain a polymeric filler and a branched olefinic fluid. The branched olefinic fluid has an average of at least 1.5 methine carbons per oligomer molecule and at least 40 methine carbons per one thousand total carbons. Additionally, the average number of carbons per molecule in the branched olefinic fluid is from 25 to 200.

18 Claims, 1 Drawing Sheet

(51) Int. Cl.
*H01B 3/20* (2006.01)
*H01B 3/28* (2006.01)
*H01B 3/44* (2006.01)
*C08L 23/08* (2006.01)
*C08L 23/14* (2006.01)
*B01J 31/22* (2006.01)

(52) U.S. Cl.
CPC ............ *C08L 23/14* (2013.01); *G02B 6/4483* (2013.01); *G02B 6/4494* (2013.01); *H01B 3/20* (2013.01); *H01B 3/28* (2013.01); *H01B 3/441* (2013.01); *B01J 2231/20* (2013.01); *C08F 2500/17* (2013.01); *C08L 2201/08* (2013.01); *C08L 2205/02* (2013.01); *C08L 2205/025* (2013.01); *C08L 2207/324* (2013.01); *G02B 6/441* (2013.01); *G02B 6/443* (2013.01); *G02B 6/4413* (2013.01); *G02B 6/4434* (2013.01); *G02B 6/4436* (2013.01)

(58) Field of Classification Search
CPC ...... C08L 23/08; C08L 23/0815; C08L 23/14; G02B 6/44; G02B 6/4413; G02B 6/4483
See application file for complete search history.

(56) References Cited

U.S. PATENT DOCUMENTS

| | | | |
|---|---|---|---|
| 5,618,882 A | 4/1997 | Hammond et al. | |
| 5,728,754 A * | 3/1998 | Lakshmanan | C08K 5/01 523/173 |
| 5,911,023 A * | 6/1999 | Risch | G02B 6/4401 385/100 |
| 6,085,009 A | 7/2000 | Risch et al. | |
| 6,205,276 B1 * | 3/2001 | Anelli | G02B 6/4494 385/100 |
| 6,374,023 B1 | 4/2002 | Parris | |
| 6,714,707 B2 * | 3/2004 | Rossi | G02B 6/4429 385/109 |
| 6,841,643 B2 | 1/2005 | Toyoda et al. | |
| 9,688,795 B2 * | 6/2017 | Cerk | C08F 210/16 |
| 9,902,791 B2 * | 2/2018 | Cerk | C08F 210/16 |
| 10,150,868 B1 * | 12/2018 | Seven | G02B 6/4494 |
| 10,162,141 B1 * | 12/2018 | Seven | G02B 6/4494 |
| 2002/0159726 A1 | 10/2002 | Brown et al. | |
| 2003/0008957 A1 * | 1/2003 | Toyoda | H01B 3/441 524/313 |
| 2003/0099446 A1 * | 5/2003 | Witt | G02B 6/4495 385/109 |
| 2003/0138226 A1 * | 7/2003 | Rossi | G02B 6/4429 385/109 |
| 2009/0297106 A1 | 12/2009 | Pizzorno et al. | |
| 2017/0267797 A1 * | 9/2017 | Cerk | C08F 210/16 |
| 2018/0022845 A1 * | 1/2018 | Cerk | C08F 210/16 |
| 2018/0051225 A1 * | 2/2018 | Zhang | C10M 143/08 |
| 2018/0066129 A1 * | 3/2018 | Esseghir | C08L 23/06 |
| 2018/0233252 A1 * | 8/2018 | Esseghir | H01B 13/14 |
| 2018/0240570 A1 * | 8/2018 | Esseghir | H01B 13/14 |
| 2018/0254126 A1 * | 9/2018 | Esseghir | H01B 7/38 |

OTHER PUBLICATIONS

PCT/US2016/022252, International Preliminary Report on Patentability dated Oct. 12, 2017.

* cited by examiner

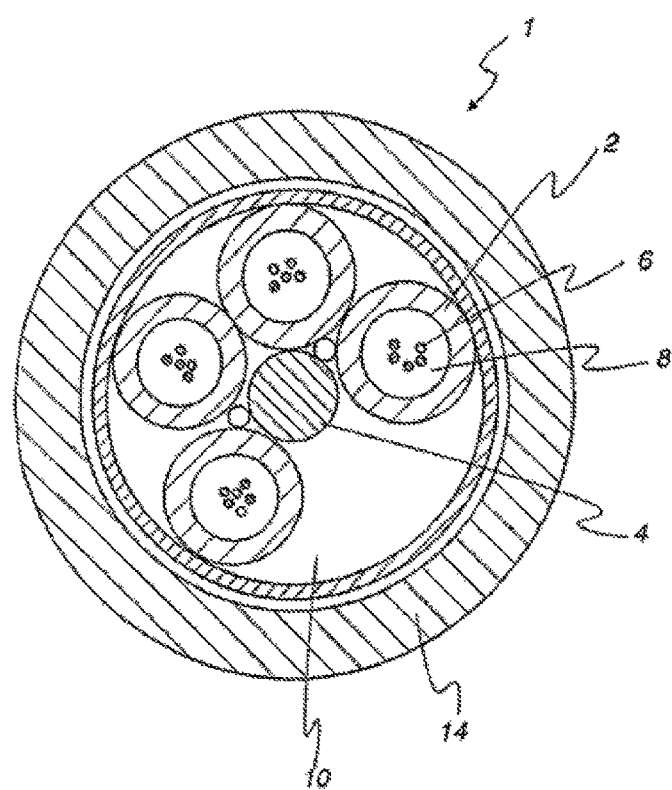

FLOODING COMPOUNDS FOR TELECOMMUNICATION CABLES HAVING POLYMERIC FILLER AND BRANCHED OLEFINIC FLUID

REFERENCE TO RELATED APPLICATIONS

The present application claims the benefit of U.S. Provisional Application No. 62/140,673, filed on Mar. 31, 2015.

FIELD

Various embodiments of the present invention relate to flooding compounds for telecommunication cables. Other aspects of the invention concern flooding compounds comprising a polymeric filler resin and a branched olefinic fluid.

INTRODUCTION

Flooding compounds are materials designed to occupy void spaces in telecommunication cables, such as the void spaces typically found around and between buffer tubes commonly used in optical fiber cables. Additionally, these compounds can be used as filling materials to suspend and protect optical fibers inside buffer tubes. It is generally preferred for flooding compounds to be free flowing at elevated temperatures (such as those temperatures used when filling a telecommunication cable), and to also be easily gelled at lower temperatures to avoid dripping at room temperature. Additionally, easy-to-clean and non-messy flooding compounds are desirable for ease of installation and prevention of environmental contamination. Although advances have been made in the art of flooding compounds, improvements are still desired.

SUMMARY

One embodiment is A flooding compound for a telecommunications cable, said flooding compound comprising:
(a) a polymeric filler; and
(b) a branched olefinic fluid having:
  (i) an average of at least 1.5 methine carbons per oligomer molecule, and
  (ii) at least 40 methine carbons per one thousand total carbons,
wherein the average number of carbons per molecule in said branched olefinic fluid is from 25 to 200.

Another embodiment is a flooding compound for a telecommunications cable, said flooding compound consisting of:
(a) a polymeric filler; and
(b) a branched olefinic fluid having:
  (i) an average of at least 1.5 methine carbons per oligomer molecule, and
  (ii) at least 40 methine carbons per one thousand total carbons; and
(c) optionally, one or more additives selected from the group consisting of antioxidants, thixotropic agents, additional fillers, stabilizers, and rheology modifiers.
wherein the average number of carbons per molecule in said branched olefinic fluid is from 25 to 200.

BRIEF DESCRIPTION OF THE DRAWINGS

Reference is made to the accompanying drawing in which:
FIG. 1 shows a cross-sectional view of a loose buffer tube optical fiber cable.

DETAILED DESCRIPTION

Various embodiments of the present invention concern flooding compounds for use in telecommunication cables (e.g., optical fiber cables). As known in the art, "flooding compounds" are substances generally employed to fill certain void spaces in telecommunication cables. The flooding compounds described herein comprise a polymeric filler and a branched olefinic fluid. Additionally, the present flooding compounds can optionally comprise one or more additives.

Polymeric Filler

The Polymeric Filler Employed in the Present Flooding Compounds can be any Polymeric filler known or envisioned by one skilled in the art of flooding compounds. In various embodiments, the polymeric filler can comprise a polyolefin elastomer. As known in the art, an "elastomer" is a polymer that experiences large reversible deformations under relatively low stress. Elastomers can either be thermoplastic or thermoset. "Thermoplastic elastomers" are elastomers having thermoplastic properties. That is, thermoplastic elastomers are optionally molded or otherwise shaped and reprocessed at temperatures above their melting or softening point. The polyolefin elastomers suitable for use herein are thermoplastic elastomers.

A "polyolefin elastomer" is an elastomeric polymer containing residues of alpha-olefin ("α-olefin") monomers. In various embodiments, the polyolefin elastomers consist of only α-olefin monomer residues, including ethylene. Such polyolefin elastomers can be either homopolymers or interpolymers. As used herein, "polymer" means a macromolecular compound prepared by reacting (i.e., polymerizing) monomers of the same or different type, and includes homopolymers and interpolymers. "Interpolymer" means a polymer prepared by the polymerization of at least two different monomer types. This generic term includes copolymers (usually employed to refer to polymers prepared from two different monomer types), and polymers prepared from more than two different monomer types (e.g., terpolymers (three different monomer types) and quaterpolymers (four different monomer types)). As used herein, "homopolymer" denotes a polymer comprising repeating units derived from a single monomer type, but does not exclude residual amounts of other components used in preparing the homopolymer, such as chain transfer agents.

Polyolefin elastomers include both polyolefin homopolymers and interpolymers. Examples of polyolefin homopolymers are homopolymers of ethylene and propylene. Examples of polyolefin interpolymers are ethylene/α-olefin interpolymers and propylene/α-olefin interpolymers. In such embodiments, the α-olefin can be a $C_{3-20}$ linear, branched or cyclic α-olefin (for the propylene/α-olefin interpolymers, ethylene is considered an α-olefin). Examples of $C_{3-20}$ α-olefins include propene, 1-butene, 4-methyl-1-pentene, 1-hexene, 1-octene, 1-decene, 1-dodecene, 1-tetradecene, 1-hexadecene, and 1-octadecene. The α-olefins can also contain a cyclic structure such as cyclohexane or cyclopentane, resulting in an α-olefin such as 3-cyclohexyl-1-propene (allyl cyclohexane) and vinyl cyclohexane. Illustrative polyolefin copolymers include ethylene/propylene, ethylene/butene, ethylene/1-hexene, ethylene/1-octene, and the like. Illustrative terpolymers include ethylene/propylene/1-octene, ethylene/propylene/butene, and ethylene/butene/1-octene. In an embodiment, the polyolefin elastomer is an ethylene/octene copolymer. Additionally, the copolymers can be random or blocky.

Polyolefin elastomers can also comprise one or more functional groups such as an unsaturated ester or acid or silane, and these elastomers (polyolefins) are well known and can be prepared by conventional high-pressure techniques. The unsaturated esters can be alkyl acrylates, alkyl methacrylates, or vinyl carboxylates. The alkyl groups can have 1 to 8 carbon atoms and preferably have 1 to 4 carbon atoms. The carboxylate groups can have 2 to 8 carbon atoms and preferably have 2 to 5 carbon atoms. The portion of the copolymer attributed to the ester comonomer can be in the range of 1 up to 50 percent by weight based on the weight of the copolymer. Examples of the acrylates and methacrylates are ethyl acrylate, methyl acrylate, methyl methacrylate, t-butyl acrylate, n-butyl acrylate, n-butyl methacrylate, and 2-ethylhexyl acrylate. Examples of the vinyl carboxylates are vinyl acetate, vinyl propionate, and vinyl butanoate. Examples of the unsaturated acids include acrylic acids or maleic acids. One example of an unsaturated silane is vinyl trialkoxysilane.

Functional groups can also be included in the polyolefin elastomer through grafting which can be accomplished as is commonly known in the art. In one embodiment, grafting may occur by way of free radical functionalization which typically includes melt blending the polyolefin elastomer, a free radical initiator (such as a peroxide or the like), and a compound containing a functional group. During melt blending, the free radical initiator reacts (reactive melt blending) with the polyolefin elastomer to form polymer radicals. The compound containing a functional group bonds to the backbone of the polymer radicals to form a functionalized polymer. Exemplary compounds containing functional groups include but are not limited to alkoxysilanes (e.g., vinyl trimethoxysilane, vinyl triethoxysilane) and vinyl carboxylic acids and anhydrides (e.g., maleic anhydride).

Commercial examples of polyolefin elastomers useful herein include very-low-density polyethylene ("VLDPE") (e.g., FLEXOMER™ ethylene/1-hexene polyethylene made by The Dow Chemical Company), homogeneously branched, linear ethylene/α-olefin copolymers (e.g.

TAFMER™ by Mitsui Petrochemicals Company Limited and EXACT™ by Exxon Chemical Company), and homogeneously branched, substantially linear ethylene/α-olefin copolymers (e.g., AFFINITY™ and ENGAGE™ polyethylene available from The Dow Chemical Company). In various embodiments, the polyolefin elastomers are the homogeneously branched linear and substantially linear ethylene copolymers. The substantially linear ethylene copolymers are especially preferred, and are more fully described in U.S. Pat. Nos. 5,272,236, 5,278,272 and 5,986,028.

The polyolefin elastomers useful herein also include propylene-, butene-, and other alkene-based copolymers. Such copolymers comprise a majority (i.e., greater than 50 weight percent ("wt %")) of units derived from the alkene (e.g., propylene) and a minority of units derived from another α-olefin (including ethylene). In an embodiment, the polyolefin elastomer includes a propylene-based copolymer. In further embodiments, the polyolefin elastomer comprises a propylene-ethylene copolymer. Exemplary propylene-based copolymers useful herein include VERSIFY™ polymers available from The Dow Chemical Company, and VISTAMAXX™ polymers available from ExxonMobil Chemical Company.

Olefin elastomers can also include ethylene-propylene-diene monomer ("EPDM") elastomers and chlorinated polyethylenes ("CPE"). Commercial examples of suitable EPDMs include NORDEL™ EPDMs, available from The Dow Chemical Company. Commercial examples of suitable CPEs include TYRIN™ CPEs, available from The Dow Chemical Company.

In one or more embodiments, the polyolefin elastomer is selected from the group consisting of ethylene-based polyolefin elastomers, propylene-based polyolefin elastomers, and combinations thereof. In such embodiments, the ethylene-based polyolefin elastomer can have an ethylene content of greater than 50 wt %, or greater than 60 wt %, based on the entire weight of the ethylene-based polyolefin elastomer, with the balance consisting of one or more alpha-olefin monomers. Additionally, the ethylene-based polyolefin elastomer can have an ethylene content ranging from greater than 50 to 90 wt %, or from 60 to 75 wt %, based on the entire weight of the ethylene-based polyolefin elastomer, with the balance consisting of one or more alpha-olefin monomers. In various embodiments, the alpha-olefin monomer is octene.

Furthermore, when the polyolefin elastomer is propylene-based, it can have a propylene content of greater than 50 wt %, greater than 70 wt %, or greater than 90 wt %, based on the entire weight of the propylene-based polyolefin elastomer, with the balance consisting of one or more alpha-olefin monomers (including ethylene). Additionally, the propylene-based polyolefin elastomer can have a propylene content ranging from greater than 50 to 99 wt %, from 70 to 98 wt %, or from 90 to 97 wt %, based on the entire weight of the propylene-based polyolefin elastomer, with the balance consisting of one or more alpha-olefin monomers (including ethylene). In various embodiments, when the polyolefin elastomer is propylene-based, the alpha-olefin comonomer is ethylene.

In one or more embodiments, the polyolefin elastomers suitable for use herein can have a degree of crystallinity in the range of from 0.01 to less than 50 wt %, from 0.5 to 40 wt %, or from 10 to 30 wt %. In other embodiments, the polyolefin elastomers can have a degree of crystallinity in the range of from 10 to less than 50 wt %, from 10 to 40 wt %, or from 20 to 30 wt %. The degree of crystallinity of the polyolefin elastomer is measured by the method described in the Test Methods section, below.

Polyolefin elastomers suitable for use herein can have a dynamic viscosity of 50,000 centipoise ("cps" or "cP") or less, or in the range of from 1,000 to 50,000 cps, from 2,000 to 40,000 cps, or from 2,500 to 30,000 cps. Melt viscosity for polyolefin elastomers is determined in accordance with the procedure provided in the Test Methods, below, at 350° F. (177° C.) using a Brookfield viscometer with an SC-31 hot-melt spindle.

Polyolefin elastomers suitable for use herein can have a number-average molecular weight ("Mn") of greater than 2,000 g/mol, at least 4,000 g/mol, or at least 5,000 g/mol. Additionally, the polyolefin elastomers can have an Mn in the range of from 2,000 to 50,000 g/mol, from 4,000 to 40,000 g/mol, from 5,000 to 30,000 g/mol, from 7,000 to 20,000 g/mol, or from 7,000 to 15,000 g/mol. Mn is determined according to the gel-permeation-chromatography method described in the Test Methods section, below.

Polyolefin elastomers suitable for use herein can have a weight-average molecular weight ("Mw") ranging from 1,000 to 100,000 g/mol, from 5,000 to 50,000 g/mol, or from 8,000 to 30,000 g/mol. Mw is determined according to the gel-permeation-chromatography method described in the Test Methods section, below.

Polyolefin elastomers suitable for use herein can have a polydispersity index ("PDI" or "Mw/Mn") ranging from 0.2 to 20, from 0.5 to 10, or from 1 to 5. PDI is determined according to the gel-permeation-chromatography method described in the Test Methods section, below.

Polyolefin elastomers suitable for use herein can have a density of less than 0.91 g/cm$^3$ or less than 0.90 g/cm$^3$. Additionally, the polyolefin elastomers can have a density of at least 0.85 g/cm³ or at least 0.86 g/cm³. Density is determined according to ASTM D 792.

Polyolefin elastomers suitable for use herein can have a melting point of at least 70° C., at least 75° C., at least 80° C., at least 85° C., at least 90° C., at least 95° C., or at least 100° C.

The melting point of suitable polyolefin elastomers can be as high as 120° C. Melting point is determined according to the method described in the Test Methods section, below.

Polyolefin elastomers suitable for use herein can have a B value in the range of from 0.1 to 2.0, from 0.5 to 1.5, or from 0.7 to 1.0. B value is determined according to the method described in the Test Methods section, below.

Polyolefin elastomers suitable for use herein can have a crystallization temperature ("Tc") in the range of from 40 to 100° C., or from 50 to 80° C. Crystallization temperature is determined according to the method described in the Test Methods section, below.

A specific example of a suitable ethylene-based polyolefin elastomer is an ethylene/octene copolymer having a viscosity of 8,200 cps and a density of 0.889 g/cm³. A specific example of a suitable propylene-based polyolefin elastomer is a propylene/ethylene copolymer having a viscosity of 2,741 cps and a density of 0.884 g/cm³. An example of a commercially available propylene/ethylene polyolefin elastomer is AFFINITY™ GA 1875, which is available from The Dow Chemical Company, Midland, Mich., USA.

Olefinic Fluid

As noted above, the flooding compounds described herein comprise a branched olefinic fluid. As used herein, the term "olefinic fluid" denotes a fluid prepared from olefinic monomers (e.g., ethylene, propylene, and other alpha-olefin monomers), which is a liquid at 22° C. and 1 atmosphere of pressure.

In various embodiments, the branched olefinic fluid can be an ethylene-based or ethylene- and propylene-based olefinic fluid, either of which may additionally contain one or more additional alpha-olefin comonomers (e.g., 1-octene). As used herein, the term "based" with respect to olefinic fluids shall denote a fluid that has greater than 85 wt % of its weight derived from ethylene for an ethylene-based fluid and greater than 85 wt % of its weight derived from ethylene and propylene combined in an ethylene- and propylene-based fluid. One ethylene-based olefinic fluid that is suitable for use herein is described in detail in co-pending patent application PCT/US2014/043754, entitled "Hyperbranched Ethylene-Based Oils and Greases," filed Jun. 24, 2014, claiming the benefit of U.S. Provisional Application Ser. No. 61/840,622, filed Jun. 28, 2013. While detailed descriptions of some suitable embodiments are included therein, and incorporated herein by reference in their entireties, preparation thereof includes, generally, reaction of the starting monomer(s) to form a mixture of oligomers therefrom. As the term is used herein, "oligomers" are molecules, formed by consecutive addition of monomer or comonomer units, which have an average molecular size of no more than 50 units. The average size is calculated as the total number of incorporated comonomer units divided by the total number of oligomer molecules. Alternatively, another indication of molecular size is the average number of carbons per molecule, which is the total carbon count divided by the total number of molecules.

The starting monomer may be ethylene alone, or ethylene and propylene, either of which may optionally further include a proportion of another alpha-olefin comonomer (e.g., 1-octene). If an alpha-olefin is to be included, it may be selected from, for example, linear alpha-olefins having from 3 to 12 carbons, such as propylene, 1-butene, 1-pentene, 1-hexene, 1-heptene, 1-octene, 1-nonene, 1-decene, 1-undecene, 1-dodecene, and combinations thereof. Smaller linear alpha-olefins having from 3 to 8 carbons are preferred, because they allow for a higher branch density of the final product oligomers. Branched alpha-olefins may also be employed in the process feed, and may include in non-limiting embodiments singly and multiply branched alpha-olefin monomers having from 5 to 16 carbons, wherein the first substituted carbon is at the "3" or greater position with respect to the vinyl, and combinations thereof. It is generally preferred that the first substitution be at the "4" or greater position. In an embodiment, when an alpha-olefin comonomer is employed in either an ethylene-based or an ethylene- and propylene-based branched olefinic fluid, the alpha-olefin is 1-octene.

In one or more embodiments, the branched olefinic fluid is selected from the group consisting of a branched olefinic fluid prepared from ethylene as the only starting monomer, a branched olefinic fluid prepared from ethylene and propylene as the only starting monomers, a branched olefinic fluid prepared from ethylene and 1-octene as the only starting monomers, and combinations of two or more thereof.

In preparing the branched olefinic fluids, it is noted that the ethylene/alpha-olefin reactivity ratio is distinct for any catalyst and is expected to vary with reaction temperature. For any given catalyst, the ethylene-olefin reactivity ratio ($r_1$) is determined by performing a co-oligomerization at low conversion and observing the oligomer composition (F) resulting from a chosen monomer composition (f). Equation 1, below, is the relation between F, f, and $r_1$, which can be used to estimate $r_1$ from a single oligomerization or obtain a more statistically reliable value for $r_1$ from a series of oligomerizations:

$$(1-F_2)/F_2 = r_1(1-f_2)/f_2 \quad \text{(Equation 1)}$$

FTIR or $^{13}$C NMR measurements of oligomer composition (F) are typically used for reactivity ratio determination, with $^{13}$C NMR being preferred. Alpha olefin monomer fractions ($f_2$) ranging from 33-66% are generally used for reactivity ratio determination, with a value of 50% being preferred. The preferred method for determining ethylene-olefin reactivity ratio involves an equimolar level of olefin and ethylene dissolved in a compatible solvent, such as an alkane, such that $f_1=f_2=\frac{1}{2}$. After a co-oligomerization of this mixture to a low conversion (<20%), the resulting oligomer compositions (F) are used in equation 1 to determine the reactivity ratio $r_1$.

Regardless of whether an alpha-olefin is employed, however, the catalyst selected to prepare the branched olefinic fluid can have an ethylene/octene reactivity ratio that is up to 20, preferably from 1 to 20, more preferably from 1 to 12, and most preferably from 1 to 6. It is noted that, while ethylene/alpha-olefin reactivity ratios will, in general, normally vary according to processing temperature, the maximum ratios set herein apply for any and all processing temperatures. Determining the reactivity based on ethylene/octene reactivity ratio may be applied regardless of whether 1-octene is included as an optional alpha-olefin in the inventive compositions, but in general smaller molecules, such as propylene, will incorporate more easily than larger molecules, such as 1-octene, and hence the ethylene/alpha-olefin reactivity ratio with, e.g., propylene, will tend to be lower. Regardless of selected co-monomer(s), determining the reactivity ratio will be required to attain a targeted oligomer composition. A simple random copolymerization model relates the mole fraction of alpha-olefin monomer ($f_2$) to the mole fraction of alpha-olefin in the copolymer ($F_2$), where $r_1$ is the ratio of ethylene reactivity to alpha-olefin reactivity, based on Equation 1, above, wherein $r_1$=ethylene reactivity/alpha-olefin reactivity; $F_2$=mole fraction alpha-olefin in the product oligomer; and $f_2$=mole fraction alpha-olefin monomer. Thus, for a given catalyst and with minimal experimentation, those skilled in the art will be able to easily determine the alpha-olefin monomer fraction ($f_2$) necessary to attain the desired alpha-olefin polymer content ($F_2$). Such desired alpha-olefin comonomer content is generally preferred to be from 30 mol % to 70 mol %, more preferably from 40 mol % to 60 mol %, particularly but not limited to the case of propylene, with the remainder desirably being the ethylene.

In preparing a suitable branched olefinic fluid, the selected starting monomer, or monomers, is/are contacted with a suitable coordination-insertion catalyst. "Coordination-insertion" means that the catalysts are capable of consecutively inserting unsaturated monomers, with the result that previously unsaturated carbons in the monomers and the oligomer become the backbone of a new oligomer. This catalyst may be selected, in one embodiment, from a wide variety of metal-ligand complexes. Those skilled in the art will be aware that catalyst performance varies with process temperature and also may vary with reaction mixture composition and conversion. Preferred catalysts are those exhibiting an activity level of 100,000 grams of oligomer per gram of catalyst metal (g/g cat). Also preferred are catalysts capable of producing a chain termination rate that results in product oligomer of a desired molecular weight.

Examples of suitable coordination-insertion catalysts may generally include, in certain non-limiting embodiments, metal-ligand complexes including any of the metals zirconium, hafnium, or titanium, and preferably zirconium or hafnium. Among these catalysts may be certain metallocene catalysts, including certain constrained geometry catalysts, and bis-phenylphenoxy catalysts, provided that the selected catalyst meets the ethylene/octene reactivity ratio and kinetic chain length requirements as defined above.

The metallocene compounds useful herein are cyclopentadienyl derivatives of titanium, zirconium and hafnium. These metallocenes (e.g., titanocenes, zirconocenes and hafnocenes) may be represented by one of the following formulas:

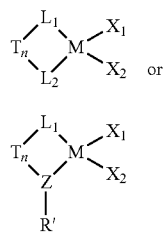

Formula I

Formula II wherein M is the metal center, and is a Group 4 metal, preferably titanium, zirconium or hafnium;

T is an optional bridging group which, if present, in preferred embodiments is selected from dialkylsilyl, diarylsilyl, dialkylmethyl, ethylenyl (—$CH_2$—$CH_2$—) or hydrocarbylethylenyl wherein one, two, three or four of the hydrogen atoms in ethylenyl are substituted by hydrocarbyl, where hydrocarbyl can be independently $C_1$ to $C_{16}$ alkyl or phenyl, tolyl, xylyl and the like, and when T is present, the catalyst represented can be in a racemic or a meso form;

$L_1$ and $L_2$ are the same or different cyclopentadienyl, indenyl, tetrahydroindenyl or fluorenyl rings, optionally substituted, that are each bonded to M, or $L_1$ and $L_2$ are the same or different cyclopentadienyl, indenyl, tetrahydroindenyl or fluorenyl, the rings of which are optionally substituted with one or more R groups, with any two adjacent R groups being joined to form a substituted or unsubstituted, saturated, partially unsaturated, or aromatic cyclic or polycyclic substituent;

Z is nitrogen, oxygen or phosphorus;

R' is a cyclic linear or branched $C_1$ to $C_{40}$ alkyl or substituted alkyl group; and $X_1$ and $X_2$ are, independently, hydrogen, halogen, hydride radicals, hydrocarbyl radicals, substituted hydrocarbyl radicals, halocarbyl radicals, substituted halocarbyl radicals, silylcarbyl radicals, substituted silylcarbyl radicals, germylcarbyl radicals, or substituted germylcarbyl radicals; or both X are joined and bound to the metal atom to form a metallacycle ring containing from about 3 to about 20 carbon atoms; or both together form an olefin, diolefin or aryne ligand.

Among the metallocene compounds which can be used in this invention are stereorigid, chiral or asymmetric, bridged or non-bridged, or so-called "constrained geometry" metallocenes. See, for purpose of non-limiting example only and for further discussion and elucidation of methods for catalyst preparation, U.S. Pat. Nos. 4,892,851; 5,017,714; 5,132,281; 5,155,080; 5,296,434; 5,278,264; 5,318,935; 5,969,070; 6,376,409; 6,380,120; 6,376,412; WO-A-(PCT/US92/10066); WO 99/07788; WO-A-93/19103; WO 01/48034; EP-A2-0 577 581; EP-A1-0 578 838; WO 99/29743, and also the academic literature, e.g., "The Influence of Aromatic Substituents on the Polymerization Behavior of Bridged Zirconocene Catalysts," Spaleck, W., et al., *Organometallics,* 1994, Vol. 13, pp. 954-963; "ansa-Zirconocene Polymerization Catalysts with Annelated Ring Ligands-Effects on Catalytic Activity and Polymer Chain Lengths," Brintzinger, H., et al., *Organometallics* 1994, Vol. 13, pp. 964-970; "Constrained Geometry Complexes—Synthesis and Applications," Braunschweig, H., et al., *Coordination Chemistry Reviews,* 2006, 250, 2691-2720; and documents referred to therein, all of which are incorporated herein by reference in their entireties.

In various embodiments, the selected catalyst may be a compound of Formula III:

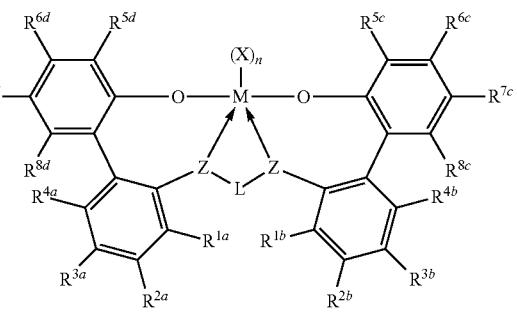

Formula III wherein M is titanium, zirconium, or hafnium, each independently being in a formal oxidation state of +2, +3, or +4; n is an integer of from 0 to 3, wherein when n is 0, X is absent; each X independently is a monodentate ligand that is neutral, monoanionic, or dianionic, or two X are taken together to form a bidentate ligand that is neutral, monoanionic, or dianionic; X and n are selected such that the metal-ligand complex of Formula (III) is, overall, neutral; each Z is independently O, S, N($C_1$-$C_{40}$)hydrocarbyl, or P($C_1$-$C_{40}$)hydrocarbyl; L is ($C_1$-$C_{40}$)hydrocarbylene or ($C_1$-$C_{40}$)heterohydrocarbylene, wherein the ($C_1$-$C_{40}$)hydrocarbylene has a portion that comprises a 2-carbon atom to 5-atom linker backbone linking the Z atoms in Formula (III) and the ($C_1$-$C_{40}$)heterohydrocarbylene has a portion that comprises a 2-atom to 5-atom linker backbone linking the Z atoms in Formula (III), wherein each atom of the 2-atom to 5-atom linker of the ($C_1$-$C_{40}$)heterohydrocarbylene independently is a carbon atom or a heteroatom, wherein each heteroatom independently is O, S, S(O), S(O)$_2$, Si($R^C$)$_2$, Ge($R^C$)$_2$, P($R^P$), or N($R^N$), wherein independently each $R^C$ is unsubstituted ($C_1$-$C_{18}$)hydrocarbyl or the two $R^C$ are taken together to form a ($C_2$-$C_{19}$)alkylene, each $R^P$ is unsubstituted ($C_1$-$C_{18}$)hydrocarbyl; and each $R^N$ is unsubstituted ($C_1$-$C_{18}$)hydrocarbyl, a hydrogen atom or absent; $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, O$R^C$, S$R^C$, Si($R^C$)$_3$, Ge($R^C$)$_3$, CN, CF$_3$, F$_3$CO, or halogen atom, and each of the others of $R^{1a}$, $R^{2a}$, $R^{1b}$, and $R^{2b}$ independently is a hydrogen, ($C_1$-$C_{40}$)hydrocarbyl, ($C_1$-$C_{40}$)heterohydrocarbyl, N($R^N$)$_2$, NO$_2$, O$R^C$, S$R^C$, Si($R^C$)$_3$, CN, CF$_3$, F$_3$CO or halogen atom; each of $R^{3a}$, $R^{4a}$, $R^{3b}$, $R^{4b}$, $R^{6c}$, $R^{7c}$, $R^{8c}$, $R^{6d}$, $R^{7d}$, and $R^{8d}$ independently is a hydrogen atom, ($C_1$-$C_{40}$)hydrocarbyl, ($C_1$-$C_{40}$)heterohydrocarbyl, Si($R^C$)$_3$, Ge($R^C$)$_3$, P($R^P$)$_2$, N($R^N$)$_2$, O$R^C$, S$R^C$, NO$_2$, CN, CF$_3$, RCS(O)—, RCS(O)$_2$—, (RC)$_2$C=N—, RCC(O)O—, RCOC(O)—, RCC(O)N(R)—, (RC)$_2$NC(O)— or halogen atom; each of $R^{5c}$ and $R^{5d}$ is independently a ($C_6$-$C_{40}$)aryl or ($C_1$-$C_{40}$)heteroaryl; and each of the aforementioned aryl, heteroaryl, hydrocarbyl, heterohydrocarbyl, hydrocarbylene, and heterohydrocarbylene groups is independently unsubstituted or substituted with 1 to 5 more substituents RS; and each $R^S$ is independently a halogen atom, polyfluoro substitution, perfluoro substitution, unsubstituted ($C_1$-$C_{18}$) alkyl, F$_3$C—, FCH$_2$O—, F$_2$HCO—, F$_3$CO—, R$_3$Si—, R$_3$Ge—, RO—, RS—, RS(O)—, RS(O)$_2$—, R$_2$P—, R$_2$N—, R$_2$C=N—, NC—, RC(O)O—, ROC(O)—, RC(O)N(R)—, or R$_2$NC(O)—, or two of the $R^S$ are taken together to form an unsubstituted ($C_1$-$C_{18}$)alkylene, wherein each R independently is an unsubstituted ($C_1$-$C_{18}$)alkyl.

In more particular embodiments, the catalyst may be selected from the compounds represented by Formulas IV to X.

Formula IV

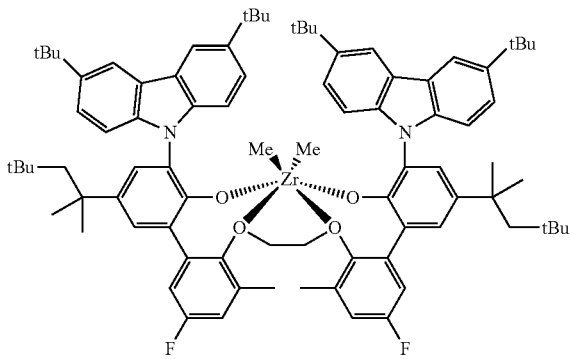

Formula V

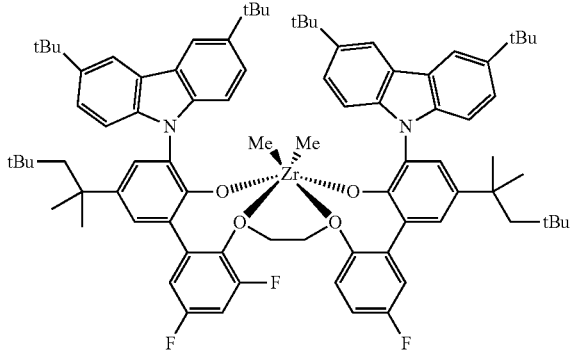

Formula VI

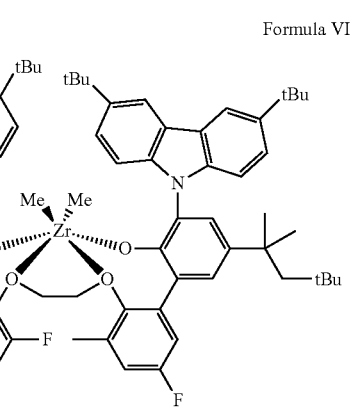

Formula VII

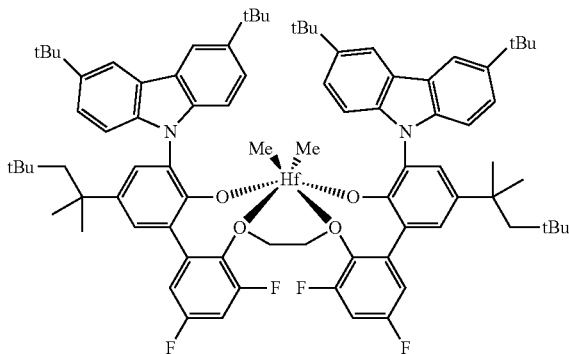

Formula VIII

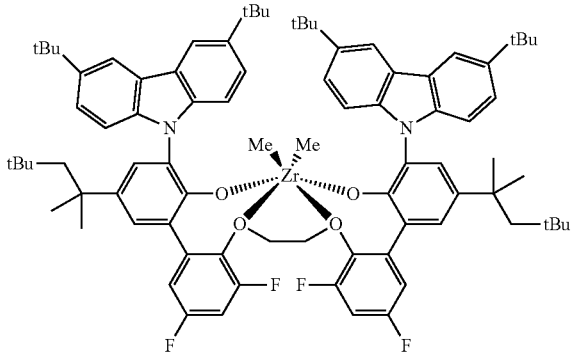

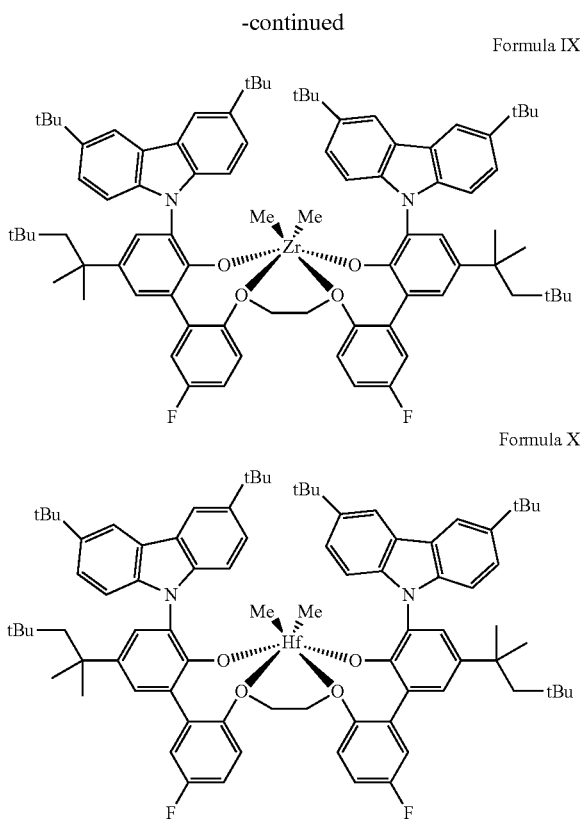

Preparation of these bis-phenylphenoxy compounds may be by any means known to or envisioned by those skilled in the art, but in general involve methods such as are disclosed in, for example, U.S. Serial Number PCT/US2012/0667700, filed Nov. 28, 2012, claiming priority to U.S. Provisional Application 61/581,418, filed Dec. 29, 2011, and U.S. Ser. No. 13/105,018, filed May 11, 2011, Publication Number 2011/0282018, claiming priority to U.S. Provisional Application 61/487,627, filed Mar. 25, 2011. Those skilled in the art will recognize that similar and analogous processes may be used to prepare other useful bis-phenylphenoxy compounds falling within the given definition.

In carrying out the process to prepare the branched olefinic oil, it is desirable that the contact between the monomer(s) and the coordination-insertion catalyst occur in a continuously-fed backmixed reactor zone. As used herein, "backmixed reactor zone" refers to an environment in which a reaction product is intermingled with unconverted reactor feeds. A continuous stirred tank reactor is preferred for this purpose, while it is noted that plug-flow reactors are specifically designed to prevent back-mixing. However, a loop reactor can accomplish a variable degree of backmixing by recycling a portion of reactor effluent to the feed of a plug-flow zone, with the recycle ratio moderating the degree of backmixing. Thus, plug-flow reactors are non-preferred, while a loop reactor with a plug flow zone is preferred.

In the inventive process, backmixing ensures reaction of already-produced oligomers with new feedstock, e.g., ethylene. It is this continuous contact that enables the oligomers to become branched via repeated olefin insertion, although in general use of propylene as a co-monomer typically requires less backmixing to accomplish equivalent branching, because the level of branching may be controlled by the concentration of propylene within the reactor.

Conditions under which the contact occurs in the continuously-fed, backmixed reactor zone may include a temperature ranging from 0 to 250° C., from 25 to 200° C., or from 50 to 180° C.; an ethylene partial pressure ranging from 15 pounds per square inch ("psi"), 103 kilopascals, ("kPa") to 500 psi (3450 kPa), from 30 psi (207 kPa) to 300 psi (2070 kPa), or from 50 psi (345 kPa) to 200 psi (1380 kPa); and a residence time ranging from 1 minute (min) to 120 min, from 5 min to 60 min, or from 10 min to 30 min. A reactor system may be comprised of many low residence time reaction zones or a few high residence time reaction zones. Nonetheless, those skilled in the art will easily understand that alteration of parameters may be employed for reasons of convenience, alteration of yield, avoidance of undesirable side products or degradation, and the like.

The result of the process is production of at least two products, denominated a branched oligomer and an organic volatile product. The term "branched oligomer" refers to the desired or target branched olefinic fluid, regardless of its order of production or relative proportion.

Such materials are collectively termed herein as "utility fluids." The term "branched" means that the oligomer molecules comprise a random distribution of linear chain segments joined together through methine carbons and having an average of at least 1.5 methine carbons per molecule. In embodiments where ethylene is employed as the sole starting monomer, the branched olefinic fluid can be hyperbranched. The term "hyperbranched" means that the methine carbons are randomly located in the molecule and are not isolated to the main polymer backbone. $^{13}C$ NMR measurement of methine carbons may be used to determine the overall branching level. It is noted that, because of the nature of coordination-insertion, continued contact of feedstock and backmixed product with the catalyst would be expected to eventually result in true, completed polymerization, or an excessive level of branching, thereby forming a material that may contain a predominant amount of a branched product. Thus, the conditions of reaction, notably time, temperature and pressure, are desirably controlled so as to produce the desired branched oligomer. The final branched oligomer may be further characterized in that at least 40 percent of the methine carbons are derived from the ethylene; and the average number of carbons per molecule is from 25 to 200., i.e., the molecular weight in the desired oligomer fraction is preferably from 350 to 2800. In particular embodiments, the branched olefinic fluid can have at least 40, at least 55, or at least 70 methine carbons per one-thousand total carbons. This branching level is affected by both the incorporation of added alpha-olefins and the incorporation of in situ generated olefins. This fraction may be conveniently denominated as the "heavies" product.

The organic volatile product comprises one or more so-called "light" oligomers, i.e., oligomers that are C14 and below, which are removable via devolatilization such that no more than 10 wt %, preferably no more than 5 wt %, remain with the branched product.

Because the present flooding compound utilizes the branched olefinic fluid per se, it is desirable to devolatilize the product mixture to separate the branched olefinic fluid and organic volatile product from one another, and thereby to recover the branched olefinic fluid. This devolatilization may be carried out using any conventional devolatilization means and methods, including, in non-limiting embodiments, use of extruder reactors and/or kneader reactors, and methods including, for example, direct separation, main evaporation, bulk evaporation, steam stripping, and/or direct devolatilization. In general, harsher devolatilization conditions will remove a greater proportion of the organic volatile product, which in general will tend to increase the fire point and lower the pour point of the branched olefinic fluid. In various embodiments, the branched fluid can thereafter be hydrogenated in order to increase the oxidative stability of the product and lower the pour point.

It is important to note that the mechanism occurring in preparing the branched olefinic fluids useful herein is coordination-insertion, where monomers add to a growing molecule through an organometallic center such that a molecular backbone is formed from carbons that originated from unsaturated carbons in the monomer units. Thus, an ethylene-only coordination-insertion oligomerization will produce branches with almost exclusively even numbers of carbons, and a coordination-insertion co-oligomerization involving ethylene and an olefin with an odd number of carbons (N) will result in branches with an odd number of carbons (N−2). This is distinct from "chain walking," which produces branches with a random distribution of both odd and even numbers of carbons. Those skilled in the art will understand without further direction how to distinguish these via $^{13}C$ NMR.

It is further suggested herein that the relatively high weight percent of product having methine branch carbons resulting from the coordination-insertion mechanism serves to ensure that a majority of the molecules are morphologically smaller and yet have the same molecular weight, which results in reduction in viscosity. As is well-known to those skilled in the art, the $^{13}C$ NMR spectra may be analyzed to determine the following quantities:

Number of methine carbons per one-thousand total carbons
Number of methyl carbons per one-thousand total carbons
Number of vinyl groups per one-thousand total carbons
Number of vinylidene groups per one-thousand total carbons
Number of vinylene groups per one-thousand total carbons Based on the results obtained in the analysis of the $^{13}C$ NMR spectra, the average number of carbons per molecule (Cn) may be determined using the following equation, which is based on the observation that every additional methine carbon, vinylidene group, and vinylene group results in an additional methyl carbon chain end:

$$1000/Cn = \text{methyl carbons} - \text{methine carbons} - \text{vinylidene groups} - \text{vinylene groups} \quad \text{(Equation 2)}$$

Alternatively, the average number of carbons per molecule (Cn) may be determined for cases wherein each oligomer molecule has a single unsaturation which occurs upon chain termination. Exclusive terminal unsaturation is common when oligomerizations and polymerizations occur without the presence of added chain transfer agents, such as hydrogen or metal alkyls.

$$1000/Cn = \text{vinyl group} + \text{vinylidene group} + \text{vinylene group} \quad \text{(Equation 3)}$$

An alternate determination of the average number of carbons per molecule (Cn) may be accomplished by simply averaging the two previous methods. The advantage of this method is that it no longer uses the vinylidene and vinylene group levels and gives the correct Cn even when no vinyls are present.

$$1000/Cn = (\text{methyl carbons} - \text{methine carbons} + \text{vinyl group})/2 \quad \text{(Equation 4)}$$

Determination of the average level of branching, in terms of number of branches per one-thousand (1,000) carbon atoms (Bc), is equal to the methine carbon count per one-thousand total carbons.

$$Bc = \text{methine carbons} \quad \text{(Equation 5)}$$

The number average degree of branching, in terms of number of branches per oligomer molecule (Bn), may be determined by multiplying Bc and Cn and resolving the one-thousand carbon basis.

$$Bn = Bc \cdot Cn/1000 \quad \text{(Equation 6)}$$

Determination of the mole fraction of oligomers having a vinyl group (Fv) is made as follows:

$$Fv = (\text{vinyl group}) \cdot Cn/1000 \quad \text{(Equation 7)}$$

For the case where every molecule has a single unsaturation, Fv becomes:

$$Fv = (\text{vinyl group})/(\text{vinyl group} + \text{vinylidene group} + \text{vinylene group}) \quad \text{(Equation 8)}$$

To determine the mole fraction of methine carbons that is derived from the ethylene feed rather than derived from added alpha-olefin monomer, mass balance calculations may be carried out. Those skilled in the art will be able to easily do this in the appropriate context with process variables taken into account. However, for some cases of added alpha-olefin monomer, it is alternatively possible to measure or conservatively estimate this quantity. (For larger proportions of propylene, it may be more convenient to employ equation 4 hereinabove.) For example:

(a) Added propylene monomer will result in methyl branches when incorporated into the oligomer backbone. A skilled practitioner can use $^{13}C$ NMR spectral data to calculate the methyl branch level per one-thousand carbons. Each methyl branch is expected to be accompanied by a methine carbon that is not derived from ethylene and/or from propylene. Therefore, calculation of the fraction of methine carbons derived from ethylene and/or from propylene is given below:

(b)

$$\text{Fraction of methines derived from ethylene} = (\text{methine carbons} - \text{methyl branches})/(\text{methine carbons}) \quad \text{(Equation 9)}$$

(c) Added hexene monomer will result in n-butyl branches when incorporated into the oligomer backbone. A skilled practitioner can use $^{13}C$ NMR spectral data to calculate the n-butyl branch level per one-thousand carbons. However, some n-butyl branches are expected to occur in the absence of added hexene both as chain ends and ethylene-derived branches. Nonetheless, attribution of all n-butyl branches to added hexene incorporation results is a conservative estimate of methine carbons derived from ethylene as follows:

$$\text{Fraction of methines derived from ethylene} = (\text{methine carbons} - n\text{-butyl branches})/(\text{methine carbons}) \quad \text{(Equation 10)}$$

The most definitive determination of methine fraction derived from ethylene is done using mass balance data around the oligomerization process. The mass balance data will indicate the net molar consumption of added monomer which can be a cumulative value for a semi-batch process or a rate value for a fully continuous process. The mass balance will also indicate the total moles of carbons as oligomers, which can be a cumulative value for a semi-batch process or a rate value for a fully continuous process.

Net added monomer per one-thousand carbons=1000*(net added monomer moles)/(total moles of carbons as oligomers)   (Equation 11)

The fraction of methines derived from ethylene is then calculated in the same manner as the methods that use only $^{13}$C NMR data:

Fraction of methines derived from ethylene=(methine carbons−net added monomer per one-thousand carbons)/(methine carbons)   (Equation 12)

Number average molecular weight (Mn) of the branched oligomer produced by the inventive process desirably ranges from 350 Da to 2800 Da, more desirably from 350 Da to 1000 Da, and most desirably from 350 Da to 700 Da. This may be determined using standard methods known to those skilled in the art, including gel permeation chromatography and gas chromatography. Furthermore, determination of Mn of oligomers using $^{13}$C NMR techniques is possible, taking into account the fact that Mn is about 14 times the average number of carbons per molecule (Cn). The exact method used to relate $^{13}$C NMR data to Mn is affected by monomer choice such as the feeding of branched and/or multiply unsaturated monomers. Nonetheless, those skilled in the art will easily comprehend how recipe changes may require amendment of this $^{13}$C NMR method to measure Mn.

Additives

The flooding compound can optionally comprise one or more additives selected from the group consisting of antioxidants, rheology modifiers (e.g., thixotropic agents), stabilizers (e.g., U.V. stabilizers), additional fillers, and combinations thereof.

Antioxidants, when employed, can be present in any conventional amount, such as an amount ranging from 0.01 to 1 wt %, or from 0.01 to 0.3 wt %, based on the total weight of the flooding compound. Suitable antioxidants include, but are not limited to, hindered phenols such as tetrakis[methylene(3,5-di-tert-butyl-4-hydroxyhydrocinnamate)] methane; bis[(beta-(3,5-ditert-butyl-4-hydroxybenzyl)methylcarboxyethyl)]-sulphide, 4,4'-thiobis(2-methyl-6-tert-butyl-phenol), 4,4'-thiobis(2-tert-butyl-5-methylphenol), 2,2'-thiobis(4-methyl-6-tert-butylphenol), and thiodiethylene bis(3,5-di-tert-butyl-4-hydroxy)-hydrocinnamate; phosphites and phosphonites such as tris(2,4-di-tert-butylphenyl) phosphite and di-tert-butylphenyl-phosphonite; thio compounds such as dilaurylthiodipropionate, dimyristylthiodipropionate, and distearylthiodipropionate; various siloxanes; polymerized 2,2,4-trimethyl-1,2-dihydroquinoline, n,n'-bis(1,4-dimethylpentyl-p-phenylenediamine), alkylated diphenylamines, 4,4'-bis(alpha, alpha-dimethylbenzyl)diphenylamine, diphenyl-p-phenylenediamine, mixed di-aryl-p-phenylenediamines, and other hindered amine anti-degradants or stabilizers.

Thixotropic agents, when employed, can be present in any conventional amount, such as an amount ranging from greater than 0 to 5 wt %, based on the total weight of the flooding compound. An example of a suitable thixotropic agent includes, but is not limited to, fumed silica. Suitable commercial thixotropic agents include, but are not limited to, AEROSIL™ products from Evonik Corp. BYK Industries and Kusumoto Chemicals also supply suitable commercial thixotropic agents.

In various embodiments, the flooding compound can be free or substantially free of thixotropic agents. As used herein, the term "substantially free" shall mean a concentration of less than 10 parts per million by weight based on the total weight of the flooding compound.

In various embodiments, the flooding compound can comprise one or more additional fillers. Such fillers include, but are not limited to, hollow microspheres, mineral inorganic compounds, polymeric fillers, and the like. When employed, additional fillers can be present in any conventional amount, such as an amount ranging from greater than 0 up to 60 wt %.

Flooding Compound The flooding compound can be prepared by simple compounding techniques known in the art. For instance, the polymeric filler, the branched olefinic fluid, and any optional additives can be compounded in a liquid operational mixer with temperature control. For instance, the ingredients can be compounded in a batch or continuous mixer. Suitable batch mixers include, but are not limited to, Banbury, Silverson, Dynamix tank mixers and agitators, and Littleford batch mixers. Continuous mixers include twin and single-screw extruders, Farrel mixers, and Buss co-kneaders.

The above-described polymeric filler can be present in the flooding compound in an amount ranging from 10 to 80 wt %, from 20 to 60 wt %, or from 30 to 50 wt %, based on the combined weight of the polymeric filler and branched olefinic fluid.

The above-described branched olefinic fluid can be present in the flooding compound in an amount ranging from 20 to 90 wt %, from 40 to 80 wt %, or from 50 to 70 wt %, based on the combined weight of the polymeric filler and branched olefinic fluid.

In one or more embodiments, the resulting flooding compound can have an apparent viscosity in the range of from 20 to 400 centipoise, from 50 to 400 centipoise, from 100 to 400 centipoise, or from 200 to 400 centipoise, as measured at 150° C. according to ASTM D 3236.

In various embodiments, the flooding compound can have a drop point of at least 65° C., at least 70° C., at least 75° C., at least 80° C., and up to 120° C. Drop point is determined according to ASTM D127.

In various embodiments, the flooding compound can have an oil separation when aged for 24 hours at 22° C. of less than 0.1, less than 0.05, or less than 0.01. Oil separation is determined according to FTM 791.

In various embodiments, the flooding compound can have at most a medium tackiness, and preferably a low tackiness. Specifically, in one or more embodiments, the flooding compound can have a minimal loading weight ("MLW") of at least 50 g, at least 75 g, at least 100 g, at least 125 g, or at least 150 g. MLW is determined according to the method provided in the Test Methods section, below.

Optical Fiber Cable In various embodiments, an optical fiber cable can be prepared that comprises at least one optical fiber, a plurality of buffer tubes, and the above-described flooding compound.

A cross-sectional view of a common loose-buffer-tube optical fiber cable is shown in FIG. 1. In this design of optical fiber cable 1, buffer tubes 2 are positioned radially around a central strength member 4, with a helical rotation to the tubes in the axial length. The helical rotation allows bending of the cable without significantly stretching the tube or the optic fibers 6.

If a reduced number of buffer tubes is required, then foamed filler rods can be used as low-cost spacers to occupy one or more empty buffer tube positions 10 to maintain cable geometry. The cable jacket 14 can generally be fabricated from a polyethylene-based material.

The above-described flooding compound can be used to fill the void spaces surrounding optic fibers 6 within buffer tubes 2. Additionally, the flooding compound can be used to fill void spaces surrounding and between the buffer tubes 2, but within the cable jacket 14. The flooding compound provides the suspension and protection needed in the immediate environment surrounding the fibers, including eliminating air space. The flooding compound also provides a barrier against water penetration, which is detrimental to optic transmission performance.

Many other buffer tube cable designs are possible. The size and materials of construction for the central strength and tensile member, the dimensions and number of buffer tubes, and the use of metallic armors and multiple layers of jacketing material are among the design elements. Such designs that incorporate a flooding compound are contemplated within the scope of the present disclosure.

An optical fiber cable, such as those described above, can typically be made in a series of sequential manufacturing steps. Optical transmission fibers are generally manufactured in the initial step. The fibers can have a polymeric coating for mechanical protection. These fibers can be assembled into bundles or ribbon cable configurations or can be directly incorporated into the cable fabrication.

Optical protective components can be manufactured using an extrusion fabrication process. Typically, a single screw plasticating extruder discharges a fluxed and mixed polymer under pressure into a wire and cable cross-head. The cross-head turns the melt flow perpendicular to the extruder and shapes the flow into the molten component. For buffer and core tubes, one or more optic fibers or fiber assemblies and flooding compound are fed into the back of the cross-head and exit the cross-head within the molten tube that is then cooled and solidified in a water trough system. This component is eventually collected as a finished component on a take-up reel.

To fabricate components comprised of two or more material layers, there typically would be separate plasticating extruders feeding the melt compositions into a multi-layer cross-head where it is shaped into the desired multi-layer construction.

Slotted core members and other profile extrusion components would typically be extruded in a similar profile extrusion process incorporating an appropriate shaping die, and then subsequently combined with the optical fiber components to fabricate the finished cable.

To control excess fiber length, a tensioning system is used to feed the fiber components into the tube fabrication process. In addition, component materials selection, the tube extrusion and cross-head equipment, and processing conditions are optimized to provide a finished component where post extrusion shrinkage does not result in excessive slack in the optic fiber components.

The extruded optical protective components, along with other components such as central components, armors, wraps, are then subsequently processed in one or more steps to produce the finished cable construction. This typically includes processing on a cabling line where the components are assembled with a fabricating extruder/crosshead then used to apply the polymeric jacketing.

Test Methods

Density

Density is determined according to ASTM D792.

For calculated density of the flooding compounds in Example 1, densities are calculated by the following formula:

$$\text{Density} = \Sigma \text{weight percent} \cdot \text{density of each component}$$

Melt Index

Melt index, or 12, is measured in accordance with ASTM D 1238, condition 190° C./2.16 kg, and is reported in grams eluted per 10 minutes. The $I_{10}$ is measured in accordance with ASTM D 1238, condition 190° C./10 kg, and is reported in grams eluted per 10 minutes.

Differential Scanning Calorimetry (Crystallinity, Melting Point, Crystallization Temperature) Differential Scanning Calorimetry ("DSC") is used to measure crystallinity in the polymers (e.g., ethylene-based (PE) polymers). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180° C. for PE (230° C. for polypropylene or "PP"). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion ($H_f$), determined from the second heat curve, by a theoretical heat of fusion of 292 J/g for PE (165 J/g, for PP), and multiplying this quantity by 100 (for example, % cryst.=($H_f$/292 J/g)× 100 (for PE)).

Unless otherwise stated, melting point(s) ($T_m$) of each polymer is determined from the second heat curve (peak Tm), and the crystallization temperature ($T_c$) is determined from the first cooling curve (peak Tc).

Drop Point

Drop point is determined according to ASTM D127.

Viscosity

Apparent viscosity of the flooding compounds is determined according to ASTM D3236 at 150° C. Kinematic viscosity can be calculated by using apparent viscosity divided by fluid density.

Melt viscosity of polymer components (i.e., polyolefin elastomers) is determined in accordance with the following procedure using a Brookfield Laboratories DVII+Viscometer in disposable aluminum sample chambers. The spindle used is an SC-31 hot-melt spindle, suitable for measuring viscosities in the range of from 10 to 100,000 centipoise (0.1 to 1,000 grams/(cm·second)). A cutting blade is employed to cut samples into pieces small enough to fit into the 1-inch wide, 5-inches long (2.5-cm wide, 13-cm long) sample chamber. The sample is placed in the chamber, which is in turn inserted into a Brookfield Thermosel and locked into place with bent needle-nose pliers. The sample chamber has a notch on the bottom that fits the bottom of the Brookfield Thermosel to ensure that the chamber is not allowed to turn when the spindle is inserted and spinning. The sample is heated to 350° F. (177° C.), with additional sample being added until the melted sample is about 1 inch (2.5 cm) below the top of the sample chamber. The viscometer apparatus is lowered and the spindle submerged into the sample chamber. Lowering is continued until brackets on the viscometer align on the Thermosel. The viscometer is turned on and set to a shear rate, which leads to a torque reading in the range of 30 to 60 percent. Readings are taken every minute for about 15 minutes, or until the values stabilize, then the final reading is recorded.

Viscosity measurements for the branched olefinic fluids are performed on a BROOKFIELD™ CAP 2000+viscometer with a 01 spindle. Approximately 70 microliters (μL) of the sample are added via a micropipette to the center of the plate which is held at 25° C. The spindle is dropped onto the sample and spun at 1000 revolutions per minute (rpm) for 40 seconds until the viscosity measurement stabilizes. The instrument is calibrated to a Cannon Instruments viscosity standard of 203 centipoise (cP, 0.203 pascal*second, Pa*s) at 25° C. For high viscosity samples, the spin rate is reduced to 300 rpm or until the percent torque drops to between 50% and 75%.

B Value

The B value is calculated as B=$P_{OE}$/(2×$P_O P_E$); where $P_E$ is a molar fraction of the ethylene component in the copolymer, $P_O$ is a molar fraction of the α-olefin component, and $P_{OE}$ is a molar fraction of α-olefin-ethylene sequences in the all dyad sequences, where the molar fraction of each component, except the terminal component, is a value calculated, and the B value is calculated based on a chart of C-NMR (270 MHz).

Tackiness

Determine tackiness using a device as taught in U.S. Pat. No. 2,406,989 ("the '989 patent"). Specifically, the device comprises, in general, two portions—a base or surface-contacting portion, designated as "A," and a counter-balancing portion, designated as "B." These portions are made up, as shown in the drawing of the '989 patent, by a unitary, comparatively light-weight (but rigid) strip "T" bent to form the flat counter-balancing portion "B" disposed at a desired angle to the base "A." Around the base "A" is tightly wrapped aluminum sheet with smooth surfaces. With the adhesive surface upmost, base "A" is attached to adhesive surface under a loading of weight (2 g to 150 g) at the center of A for 30 seconds and is then removed. The surface is considered to be tack free if base "A" is pulled completely away from the surface by the counter-balancing portion "B" in less than 10 seconds. By changing the weight, the minimal loading weight to keep portion "A" staying on the surface is recorded as "minimal loading weight (MLW)". A high MLW value indicates lower tackiness and a low MLW value indicates higher tackiness.

Gel Absorption

A 75-mil-thick compression-molded specimen (~0.5×0.2 inches) of jacket material (LDPE, MDPE, HDPE or polypropylene), is immersed in a flooding compound at 60° C. After 10 days, the flooding compound covering the surface of the jacket material is wiped out and the weight gain of the jacket material plaque is calculated by comparing its weight before and after aging.

Gel Permeation Chromatography

A high-temperature gel permeation chromatography ("GPC") system is employed, equipped with Robotic Assistant Deliver ("RAD") system for sample preparation and sample dissolving the sample in nitrogen-purged and pre-heated TCB (containing 200 ppm BHT) for 2.5 hours at 160° C. with gentle agitation.

The GPC column set is calibrated by running twenty narrow molecular weight distribution polystyrene ("PS") standards. The molecular weight ("MW") of the standards ranges from 580 to 8,400,000 g/mol, and the standards are contained in six "cocktail" mixtures. Each standard mixture has at least a decade of separation between individual molecular weights. The equivalent polypropylene ("PP") molecular weights of each PS standard are calculated by using the following equation, with reported Mark-Houwink coefficients for polypropylene (Th. G. Scholte, N. L. J. Meijerink, H. M. Schoffeleers, and A. M. G. Brands, J. Appl. Polym. Sci., 29, 3763-3782 (1984)) and polystyrene (E. P. Otocka, R. J. Roe, N. Y. Hellman, P. M. Muglia, Macromolecules, 4, 507 (1971)):

$$M_{pp} = \left( \frac{K_{ps} M_{ps}^{a_{ps}+1}}{K_{pp}} \right)^{\frac{1}{a_{pp}+1}}$$

where $M_{pp}$ is PP equivalent MW, $M_{PS}$ is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit as a function of elution volume. Number average and weight average molecular weights are calculated according to the following equations:

$$Mn = \frac{\sum_i Wf_i}{\sum_i \left(\frac{Wf_i}{M_i}\right)}, \tag{2}$$

$$Mw = \frac{\sum_i (Wf_i * M_i)}{\sum_i Wf_i}, \tag{3}$$

where $Wf_i$ and $M_i$ are the weight fraction and molecular weight of elution component i, respectively.

Materials

The following materials are employed in the Examples, below.

An ethylene-octene polyolefin elastomer ("E-O POE") is employed, having an ethylene content 71.9 wt %, an Mn of 10,000 g/mol, a crystallinity of 28.4 wt %, a density of 0.887 g/cm$^3$, a crystallization temperature of 71.37° C., a melting point of 85.6° C., a B value of 0.9, and a dynamic viscosity of 8,200 cps at 177° C.

The E-O POE is prepared in a continuous solution polymerization. All reagents (monomer, comonomer, hydrogen) are dissolved into a solvent carrier feed stream and injected into a recirculated, single loop reactor. The solvent is ISOPAR E. The catalyst is (titanium, [N-(1,1-dimethylethyl)-1,1-dimethyl-1-[(1,2,3,4,5-η)-2,3,4,5-tetramethyl-2,4-cyclopentadien-1-yl]silanaminato(2-)-κN][(1,2,3,4-η)-1,3-pentadiene]-). Two co-catalysts are used: tris(2,3,4,5,6,-pentafluorophenyl)borane and modified methylaluminoxane. The two co-catalysts are mixed prior to injection, and this mixture is fed to the reactor separately from the catalyst. The alpha-olefin comonomer (1-octene) concentration in the feed and in the reactor is used to controlled the density of the polymer, and the hydrogen concentration is used to control the melt viscosity (or molecular weight) of the polymer. The reactor product stream is passed through additional unit operations in order to remove the unreacted reagents and solvent. The polymer melt is then extruded into pellets. The polymer is stabilized with ppm amounts of IRGANOX™ 1010. The E-O POE is prepared under the following polymerization conditions:

| | |
|---|---|
| Temperature (° C.) | 133 |
| Pressure (barg) | 34.3 |
| Ethylene concentration (kg/m³) | 14.0 |
| Polymer concentration (wt %) | 38.3 |
| 1-Octene concentration | Reactor Exit = 54.4 kg/m³ Feed = 20.3 wt % |
| Reynolds number | Reaction pipe = 6700 Heat exchanger tubes = 53 |
| Residence time (min.) | 19.8 |
| Recycle Ratio | 37.3 |
| Catalyst Efficiency (lb polymer/lb catalyst metal) | 1,700,000 |

A propylene-ethylene polyolefin elastomer ("P-E POE") is employed, having a propylene content of 95 wt %, an Mn of 14,500 g/mol, a crystallinity of 28.6 wt %, a density of 0.884 g/cm³, a crystallization temperature of 77.9° C., a melting point of 105° C., a B value of 0.93, and a dynamic viscosity of 2,741 cps at 177° C.

The P-E POE is prepared using a hafnium metal complex of a polyvalent aryloxyether catalyst that is hafnium, [[2',2'''-[(1R,2R)-1,2-cylcohexanediylbis(methyleneoxy-κO)]bis[3-(9H-carbazol-9-yl)-5-methyl[1,1'-biphenyl]-2-olato-κO]](2-)]dimethyl:

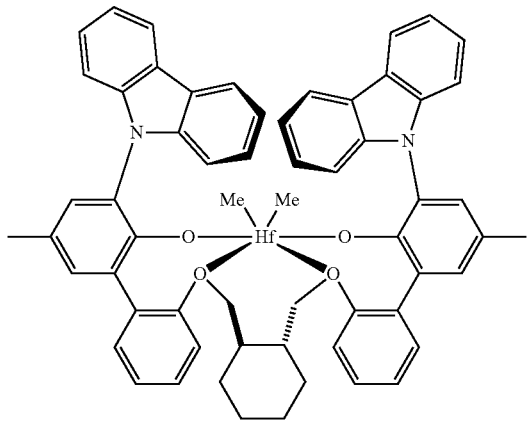

The catalyst and cocatalyst component solutions are metered using pumps and mass flow meters and are combined with the catalyst flush solvent and introduced into the bottom of the reactor. The cocatalyst used is a long-chain alkyl ammonium borate of approximate stoichiometry equal to methyl di(octadecyl)ammonium tetrakis(pentafluorophenyl)borate (MDB) combined with a tertiary component, tri(isobutyl)aluminum modified methalumoxane (MMAO) containing a molar ratio of i-butyl/methyl groups of about ⅓. The cocatalyst is in a molar ratio based on Hf of 1.2/1, and MMAO (25/1 Al/Hf).

The polymerization process is exothermic. There are about 900 British thermal units (BTUs) released per pound (2009 kJ/kg) of propylene polymerized and about 1,500 BTUs released per pound (3489 kJ/kg) of ethylene polymerized. The primary process design consideration is the removal of the heat of reaction. The propylene-ethylene copolymers are produced in a low-pressure, solution polymerization loop reactor, made up of a 3-inch (76-mm) loop pipe plus two heat exchangers, the total volume of which is 31.4 gallons (118.9 liter).

Solvent and monomer (propylene) are injected into the reactor as a liquid. The comonomer (ethylene) gas is fully dissolved in the liquid solvent. The feed is cooled to 5° C. before injection into the reactor. The reactor operates at polymer concentration from 15 wt % to 20 wt %. The adiabatic temperature rise of the solution accounts for some of the heat removal from the polymerization reaction. Heat exchangers within the reactor are utilized to remove the remaining heat of reaction allowing for reactor temperature control at the reaction temperatures.

The solvent used is a high purity iso-paraffinic fraction available from Exxon under the trademark ISOPAR™ E. Fresh propylene is passed through a bed of Selexsorb COS for purification before mixing with a recycle stream containing solvent, propylene, ethylene, and hydrogen. After mixing with the recycle stream, the combined stream is passed through a bed of 75 wt % Molecular Sieve 13X and 25 wt % Selexsorb CD for further purification before using a high pressure 700 psig (4826 kPa) feed pump to pass the contents to the reactor. Fresh ethylene is passed through a Selexsorb COS bed for purification before compressing the stream to 750 psig (5171 kPa). Hydrogen (a telogen used to reduce molecular weight) is mixed with the compressed ethylene before the two are mixed/dissolved into the liquid feed. The total stream is cooled to an appropriate feed temperature (5° C.). The reactor operates at 500-525 psig (3447-3619 kPa) and a control temperature of 150° C. The propylene conversion in the reactor is maintained by controlling the catalyst injection rate. The reaction temperature is maintained by controlling the water temperature across the shell side of the heat exchanger at 85° C. The residence time in the reactor is short (about 10 minutes).

Upon exiting the reactor, water and additive are injected into the polymer solution. The water hydrolyzes the catalyst, terminating the polymerization reaction. The additives consist of antioxidants, i.e., 500 ppm of a phenolic and 1000 ppm of a phosphite, which remain with the polymer and act as stabilizers to prevent polymer degradation while in storage before subsequent fabrication at an end-user's facility. The post-reactor solution is super-heated from reactor temperature to 230° C. in preparation for a two-stage devolatilization. The solvent and unreacted monomers are removed during the devolatilization process. The polymer melt is pumped to a die for underwater pellet cutting.

Solvent and monomer vapors exiting the top of the devolatilizers are sent to a coalescer. The coalescer removes polymer entrained in the vapor during devolatilization. The clean vapor stream leaving the coalescer is partially condensed through a series of heat exchangers. The two-phase mixture enters a separation drum. The condensed solvent and monomers are purified (this is the recycle stream described above) and re-used in the reaction process. The vapors leaving the separating drum, mostly containing propylene and ethylene are sent to a block flare and burned.

SUNPAR™ 110 is a paraffin oil having a kinematic viscosity of 21.2 cSt at 40° C., which is commercially available from Sunoco Inc., Pittsburgh, Pa., USA.

The polybutene oil has an average Mn of ~320 g/mol, a viscosity of 27 to 33 cSt at 38° C., an isobutylene content of greater than 90%, a density of 0.84 g/mL at 25° C., a glass transition temperature ($T_g$) of −90.5° C., a pour point (ASTM D 97) of −51° C., and is commercially available from Sigma-Aldrich, St. Louis, Mo., USA.

IRGANOX™ 1035 is a commercial antioxidant having the chemical name thiodiethylene bis[3-(3,5-di-tert-butyl-4-hydroxy-phenyl)propionate], which is available from BASF SE, Ludwigshafen, Germany.

AXELERON™ GP 6059 BK is a low-density polyethylene ("LDPE") jacket compound having a density of 0.932 g/cm$^3$, a melt index ("12") of 0.60 g/10 min., a carbon black content of 2.6 wt %, and is commercially available from The Dow Chemical Company, Midland, Mich., USA.

AXELERON™ FO 8864 BK is a medium-density polyethylene jacket ("MDPE") compound having a density of 0.941 g/cm$^3$, a melt index ("12") of 0.70 g/10 min., a carbon black content of 2.6 wt %, and is commercially available from The Dow Chemical Company, Midland, Mich., USA.

AXELERON™ FO 6318 BK is a high-density polyethylene ("HDPE") jacket compound having a density of 0.954 g/cm$^3$, a melt index ("12") of 0.70 g/10 min., a carbon black content of 2.6 wt %, and is commercially available from The Dow Chemical Company, Midland, Mich., USA.

BC245MO™ is a high impact polypropylene ("PP") copolymer jacket compound having a density of 0.905 g/cm$^3$, a melt flow rate at 230° C. and 2.16 kg of 3.5 g/10 min., and is commercially available from Borealis AG, Vienna, Austria.

NAPTEL™ 500 is a commercial flooding compound comprising 77 wt % polyisobutylene wax and 23 wt % mineral oil, which has a viscosity at 150° C. of from 40 to 60 Cp (ASTM D 3236), a ring-and-ball softening point of between 80 and 100° C. (ASTM E 28), and is commercially available from Soltex Inc., Houston, Tex., USA.

SONNEBORN™ 683 is a commercial flooding compound that is primarily a wax-type material without branching polyolefins, which has a melting point of at least 200° F. (93.3° C.), a viscosity at 302° F. (150° C.) in the range of from 1,700 to 1,800 SUS (ASTM D 2161), and is commercially available from Sonneborn, LLC, Parsippany, N.J., USA.

The hollow-glass-microsphere filler has a density of about 0.10 g/cm$^3$, a particle size range of 90 to 106 μm, and is commercially available from Cospheric LLC, Santa Barbara, Calif., USA.

Ethylene-Only Hyperbranched Olefinic Fluid

In order to prepare a suitable hyperbranched, ethylene-only olefinic fluid, feeds comprising ethylene, ISOPAR-E™ as a solvent, and toluene (as a solvent to dissolve the catalyst) are passed through columns of activated alumina and Q-5 in order to first remove water and oxygen therefrom. These feeds are then introduced into an adiabatic, continuous stirred tank reactor (CSTR), with typical CSTR backmixing, with the solvent (toluene), catalyst (Formula V), and activator (ISOPAR-E™) being introduced into the reactor via stainless steel lines from syringe pumps located in a glovebox containing an atmosphere of nitrogen. The ethylene and the catalyst solution are introduced via independent dip tubes and metered with the aid of mass flow controllers. The reaction is allowed to proceed at a temperature of 60° C., with a residence time of 10 minutes, a C2 feed rate of 1.00 g/min, and a feed mass fraction of $C_2$ monomer of 0.14 ($C_2$ feed rate/total feed rate).

The vessel is heated by circulating hot silicone oil through the external jacket and cooled when required via an internal cooling coil with water. The reactor pressure is controlled with a GO REGULATOR™ BP-60 back pressure regulator. The system is run hydraulically filled with no head space and without a devolatilization unit. Polymer solutions are removed from the vessel for periodic sampling from an outlet on the reactor head fitted with an electrically heated stainless steel line. Solution olefin concentrations of the reactor effluent are then measured via a Fourier Transform Near Infrared (FT-NIR) spectrometer to determine the in-reactor concentration of ethylene. Further analyses of the product are carried out via $^{13}$C NMR as described below.

Once the desired reaction endpoint is reached, the hyperbranched olefinic fluid is treated, prior to collection, with a catalyst deactivator comprising 2-propanol with water and a stabilizer package containing IRGANOX™ 1010 (i.e., pentaerythritol tetrakis(3,5-di-tert-butyl-4-hydroxyhydrocinnamate)), and IRGAFOS™ 168 (i.e., tris(2,4-di-tert-butylphenyl) phosphite) from CIBA GEIGY CORPORATION™. Multiple runs are performed in the CSTR and the oligomer fractions are all combined. Oligomers are first rotary evaporated at 80° C./10 Torr to remove solvent, then passed through a wiped-film evaporator (WFE) set at 155° C./100 mTorr. The products from the WFE are collected and tested for viscosity. Among the products, those designated as "lights" are generally residual solvent and light product molecules that tend to degrade the flash and fire points of the material, while the "heavies" are all other products that comprise the desirable hyperbranched ethylene-based olefinic fluid to be used in making a flooding compound. Kinematic viscosity (cSt, 40° C./100° C., according to ASTM D445) is 34.94/6.60. Samples are not hydrogenated, such as might be desirable on a commercial scale for product stability, and one olefinic unit remains for each oligomer chain.

Table 1 shows the experimental conditions that are used in synthesizing the hyperbranched, ethylene-only olefinic fluid for Example 1, for each of the runs. In this case the catalyst corresponds to Formula V.

TABLE 1

| Conditions for Synthesis of Ethylene-only Hyperbranched Olefinic Fluid | | | | | | |
|---|---|---|---|---|---|---|
| Run | FT-NIR C2 Conv (%) | FT-NIR C2 (g/dL) | FT-NIR Cx (g/dL) | Total feed rate (g/min) | Total catalyst metal (ppm) | Catalyst feed Rate (μmol/min*) |
| 1 | 96.2 | 0.37 | 4.2 | 7.36 | 0.56 | 0.045 |

*μmol/min = micromoles per minute

For $^{13}$C NMR confirmations, samples are dissolved in 10 millimeter (mm) NMR tubes in chloroform-d with 0.02 M chromium(III) acetyl acetonate (Cr(AcAc)$_3$, $C_{15}H_{21}CrO_6$, tris(2-4-pentanediono)-chromium(III)) added. The typical concentration is 0.50 g/2.4 mL. The tubes are then heated in a heating block set at 50° C. The sample tubes are repeatedly vortexed and heated to achieve a homogeneous flowing fluid. For samples with visible wax present, tetrachloroethane-d$_2$ is used as the solvent instead of chloroform-d, and the sample preparation temperature is 90° C. $^{13}$C NMR spectra are taken on a BRUKER™ AVANCE™ 400 megahertz (MHz) spectrometer equipped with a 10 mm cryoprobe. The following acquisition parameters are used: 5 seconds relaxation delay, 90 degree pulse of 13.1 microseconds, 256 scans. The spectra are centered at 80 ppm with a spectral width of 250 ppm. All measurements are taken without sample spinning at either 50° C. (for chloroform solutions) or 90° C. (for tetrachloroethane solutions). The $^{13}$C NMR spectra are referenced to 77.3 ppm for chloroform or 74.5 ppm for tetrachloroethane. The analysis results from $^{13}$C NMR spectra are given in Table 2. The hyperbranched ethylene-only olefinic fluid has a viscosity of 72 cps at 25° C.

TABLE 2

$^{13}$C NMR Analysis Results of Ethylene-only Hyperbranched Olefinic Fluid

| | Degree of Branching | | | | Total Branches | Concentration of unsaturation | | | | | Branches |
|---|---|---|---|---|---|---|---|---|---|---|---|
| | Hexyl (per 1000 | | | | (per 1000 | | Vinyl | | | % | per |
| Mn | carbons) | Butyl | Ethyl | Methyl | carbons) | Vinylene | V1 | V3 | Vinylidene | Vinyls | molecule |
| 528 | 39.0 | 22.1 | 64.9 | 0.7 | 126.5 | 4.25 | 5.57 | 11.75 | 6.54 | 61.6 | 4.78 |

Ethylene/Propylene Branched Olefinic Fluid

Preparation of the ethylene/propylene branched olefinic fluid is conducted in a 2-L Parr™ batch reactor on a semi-batch basis. The reactor is heated by an electrical heating mantle and is cooled by an internal serpentine cooling coil containing cooling water. Both the reactor and the heating/cooling system are controlled and monitored by a CAMILE™ TG process computer. The bottom of the reactor is fitted with a dump valve, which empties the reactor contents into a stainless steel dump pot, which is prefilled with a catalyst kill solution (typically 5 mL of an IRGAFOX™/IRGANOX™/toluene mixture). The dump pot is vented to a 30-gallon blowdown tank, with both the pot and the tank $N_2$ purged. All chemicals used for polymerization or catalyst makeup are run through purification columns to remove any impurities that may affect polymerization. The propylene is passed through 2 columns, the first containing $Al_2O_4$ alumina, the second containing Q5 reactant to remove oxygen. The ethylene is also passed through two columns, the first containing $Al_2O_4$ alumina, and 4-Angstroms (Å) pore size molecular sieves, the second containing Q5 reactant. The $N_2$, used for transfers, is passed through a single column containing $Al_2O_4$ alumina, 4-Å pore size molecular sieves and Q5 reactant.

The reactor is loaded first with toluene and then with propylene to the desired reactor load. After liquid feed addition, the reactor is heated up to the polymerization temperature set point. Where ethylene is used, it is added to the reactor when at reaction temperature to maintain reaction pressure set point. Ethylene addition amounts are monitored by a micro-motion flow meter.

The catalyst and activators are mixed with the appropriate amount of purified toluene to achieve a desired molarity solution. The catalyst and activators are handled in an inert glove box, drawn into a syringe and pressure transferred into the catalyst shot tank. This is followed by 3 rinses of toluene, 5 mL each.

Immediately after catalyst addition, the run timer begins. Where ethylene is used, it is then added by the CAMILE™ to maintain reaction pressure set point in the reactor. These polymerizations are run for the desired amount of time, then the agitator is stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the oligomers are weighed for yield/efficiencies, and submitted for testing.

This preparation is carried out as described above for the ethylene-only hyperbranched olefinic fluid, except with the parameters shown in Table 3, below, and except that the co-monomer propylene ($C_3$) is included as a feed, with a C3 feed rate of 1.00 g/min, and a feed mass fraction of $C_3$ monomer of 0.14 ($C_3$ feed rate/total feed rate). The resulting branched olefinic fluid exhibits the characteristics shown in Table 4. The catalyst corresponds to Formula X. The ethylene/propylene branched olefinic fluid has a viscosity of 215 cps at 25° C.

TABLE 3

Conditions for Synthesis of Ethylene/Propylene Branched Olefinic Fluid

| Temp °C. | Toluene g | Batch Ethylene g | Ethylene Pressure psi | Batch Propylene g | Ethylene g initial | g added | Run time min | Catalyst Formula | µmoles | metal | RIBS-2* µmoles | MMAO-3A** µmoles | Exotherm °C. |
|---|---|---|---|---|---|---|---|---|---|---|---|---|---|
| 120 | 300 | 17.1 | 359.7 | 140.5 | 17.1 | 10.1 | 3.8 | X | 2.5 | Hf | 3 | 10 | 1.9 |

*RIBS-2 co-catalyst: (CAS); Amines, bis(hydrogenated tallow alkyl)methyl, tetrakis(pentafluorophenyl)borate(1-)
**MMAO-3A co-catalyst is a modified methyl aluminoxane

TABLE 4

Properties of Ethylene/Propylene Branched Olefinic Fluid

| Unsaturation | | | | | | Viscosity | |
|---|---|---|---|---|---|---|---|
| % Vinyls | % Vinylidenes | % Vinylenes | Branches per 1000 C's | Mol % C3 | Mn ($^1$H NMR) | @ 40° C. (cSt) | @ 100° C. (cSt) |
| 31 | 68 | 1 | 195.04 | 48.6 | 730 | 109.5 | 16.0 |

Ethylene/Octene Branched Olefinic Fluid

Preparation of the ethylene/octene branched olefinic fluid is conducted in a 2-L Parr™ batch reactor on a semi-batch basis. The reactor is heated by an electrical heating mantle and is cooled by an internal serpentine cooling coil containing cooling water. Both the reactor and the heating/cooling system are controlled and monitored by a CAMILE™ TG process computer. The bottom of the reactor is fitted with a dump valve, which empties the reactor contents into a stainless steel dump pot, which is prefilled with a catalyst kill solution (typically 5 mL of a IRGAFOX™/IRGANOX™/toluene mixture). The dump pot is vented to a 30-gallon blowdown tank, with both the pot and the tank $N_2$ purged. All chemicals used for polymerization or catalyst makeup are run through purification columns to remove any impurities that may affect polymerization. The octene is passed through 2 columns, the first containing $Al_2O_4$ alumina, the second containing Q5 reactant to remove oxygen. The ethylene is also passed through two columns, the first containing $Al_2O_4$ alumina, and 4-Angstroms (Å) pore size molecular sieves, the second containing Q5 reactant. The $N_2$, used for transfers, is passed through a single column containing $Al_2O_4$ alumina, 4-Å pore size molecular sieves and Q5 reactant.

The reactor is loaded first with octene to the desired reactor load. After liquid feed addition, the reactor is heated up to the polymerization temperature set point. Where ethylene is used, it is added to the reactor when at reaction temperature to maintain reaction pressure set point. Ethylene addition amounts are monitored by a micro-motion flow meter.

The catalyst and activators are mixed with the appropriate amount of purified toluene to achieve a desired molarity solution. The catalyst and activators are handled in an inert glove box, drawn into a syringe and pressure transferred into the catalyst shot tank. This is followed by 3 rinses of toluene, 5 mL each.

Immediately after catalyst addition, the run timer begins. Where ethylene is used, it is then added by the CAMILE™ to maintain reaction pressure set point in the reactor. These polymerizations are run for the desired amount of time, then the agitator is stopped and the bottom dump valve opened to empty reactor contents to the dump pot. The dump pot contents are poured into trays placed in a lab hood where the solvent is evaporated off overnight. The trays containing the remaining polymer are then transferred to a vacuum oven, where they are heated up to 140° C. under vacuum to remove any remaining solvent. After the trays cool to ambient temperature, the oligomers are weighed for yield/efficiencies, and submitted for testing.

TABLE 5

Conditions for Synthesis of Ethylene/Octene Branched Olefinic Fluid

| Temp ° C. | Toluene g | Batch Ethylene g | Ethylene Pressure Psi | Batch Octene g | Ethylene initial g | Ethylene added g | Run time min | Catalyst Formula | Catalyst µmoles | Catalyst metal | RIBS-2* µmoles | MMAO-3A** µmoles | Exotherm ° C. |
|---|---|---|---|---|---|---|---|---|---|---|---|---|---|
| 100 | 0 | 18 | 110 | 650 | 18 | 37.5 | 12 | X | 2.5 | Hf | 3 | 10 | 3.5 |

TABLE 6

Properties of Ethylene/Octene Branched Olefinic Fluid

| Unsaturation | | | | | | Viscosity |
|---|---|---|---|---|---|---|
| % Vinyls | % Vinylidenes | % Vinylenes | Branches per 1000 C's | Mol % C8 | Mn ($^1$H NMR) | @ 25° C. (cps) |
| 85 | 4 | 11 | 116 | 42.8 | 410 | 64.5 |

EXAMPLES

Example 1

Prepare five Samples (S1-S5) and four Comparative Samples (CS1-CS4) according to the following procedure and the formulations provided in Table 7, below. Each component is first weighed then mixed in a heated container under agitation. The temperature was set at 80° C. for samples containing E-O POE and 120° C. for samples containing P-E POE. After agitating for 10 minutes, the heat is turned off and the flooding compound is poured out to collect.

TABLE 7

Compositions of S1-S5 and CS1-CS4

|  | CS1 | CS2 | CS3 | CS4 | S1 | S2 | S3 | S4 | S5 |
|---|---|---|---|---|---|---|---|---|---|
| E-O POE (wt %) | 39.80 | 39.80 | — | — | 39.80 | 39.80 | 29.80 | — | — |
| P-E POE (wt %) | — | — | 49.80 | 49.80 | — | — | — | 49.80 | 39.80 |
| Polybutene oil (wt %) | — | 60.00 | — | 50.00 | — | — | — | — | — |
| SUNPAR 110 (wt %) | 60.00 | — | 50.00 | — | — | — | — | — | — |
| Ethylene-only Hyperbranched Fluid (wt %) | — | — | — | — | 60.00 | — | — | 50.00 | — |
| Ethylene/Propylene Branched Fluid (wt %) | — | — | — | — | — | 60.00 | — | — | — |
| Ethylene/Octene Branched Fluid (wt %) | — | — | — | — | — | — | 70.00 | — | 60.00 |
| IRGANOX ™ 1035 (wt %) | 0.20 | 0.20 | 0.20 | 0.20 | 0.20 | 0.20 | 0.20 | 0.20 | 0.20 |
| Total: | 100 | 100 | 100 | 100 | 100 | 100 | 100 | 100 | 100 |

Analyze S1-S5 and CS1-CS5 according to the Test Methods described above. CS5 is SONNEBORN™ 683, and is tested as received. The results are provided in Table 8, below.

TABLE 8

Properties of S1-S5 and CS1-CS5

|  | CS1 | CS2 | CS3 | CS4 | CS5 | S1 | S2 | S3 | S4 | S5 |
|---|---|---|---|---|---|---|---|---|---|---|
| Viscosity @ 150° C. (cP) | 313 | 432 | 349 | 325 | 307 | 309 | 329 | 195 | 288 | 212 |
| Tackiness | High (2 g) | High (2 g) | Low (100 g) | Low (150 g) | Med. (50 g) | High (5 g) | High (2 g) | High (2 g) | Low (150 g) | Low (150 g) |
| Drop Point (° C.) | 81.4 | >80 | 91.2 | >80 | 102.8 | >80 | >80 | >80 | >80 | >80 |
| Density (g/cm³) (calculated) | — | — | — | — | 0.87 | — | — | — | — | 0.86 |
| Gel Absorption in LDPE (%) | 7.93 | 6.15 | 10.36 | 4.43 | 11.30 | 3.14 | 2.62 | 2.61 | 3.54 | 2.53 |
| Gel Absorption in MDPE (%) | 5.53 | 3.57 | 7.38 | 2.44 | 6.52 | 1.53 | 1.53 | 1.74 | 1.72 | 1.46 |
| Gel Absorption in HDPE (%) | 3.55 | 1.92 | 4.24 | 1.68 | 3.89 | 0.79 | 0.85 | 1.05 | 0.73 | 0.87 |
| Gel Absorption in PP (%) | 6.54 | 3.85 | 6.87 | 2.97 | 4.82 | 2.45 | 2.38 | 2.60 | 2.19 | 2.12 |

CS1 and CS2, which are compositions using a high-melt-index ethylene-octene copolymer resin mixed with a polybutene and paraffinic oil respectively, both demonstrate an ability to achieve target viscosity and drop point properties and, following heat aging in polyolefin materials, show the typically high absorption levels in these materials used in cable construction. CS3 and CS4, which are compositions using a high-melt-index ethylene-propylene copolymer resin mixed with a polybutene and paraffinic oil respectively, both demonstrate an ability to achieve target viscosity and drop point properties and, following heat aging in polyolefin materials, show the typically high absorption levels in these materials used in cable construction. CS5 illustrates the performance of a petroleum-based commercial flooding compound, SONNEBORN™ 683, with corresponding heat aging absorption in olefin cable materials.

S1 through S5 are examples using mixtures of polyolefin elastomer and branched olefinic fluids showing significantly improved absorption in typical olefin materials used in cable construction, such as jacketing and buffer tube materials, while achieving adequate drop point and viscosity characteristics for typical cable filling operations.

Example 2

Prepare one additional Sample (S6) having 37.8 wt % P-E POE, 57.0 wt % ethylene/propylene branched olefinic fluid, 5.0 wt % hollow microsphere filler, and 0.2 wt % antioxidant using the preparation method described above in Example 1. Analyze S6 using the Test Methods described above. The results of the analysis are reported in Table 9, below, along with repeated results for S5 and CS5 for comparison.

TABLE 9

Properties of S5, S6, and CS5

|  | S5 | S6 | CS5 |
|---|---|---|---|
| Viscosity @ 150° C. (cP) | 212 | 1030 | 307 |
| Tackiness | Low (150 g) | Low (150 g) | Med. (50 g) |
| Drop Point (° C.) | >80 | >90 | 102.8 |
| Density (g/cm³) | 0.86 | 0.62 | 0.87 |
| Gel Absorption in LDPE (%) | 2.53 | 4.50 | 11.30 |
| Gel Absorption in MDPE (%) | 1.46 | 2.03 | 6.52 |
| Gel Absorption in HDPE (%) | 0.87 | 1.79 | 3.89 |
| Gel Absorption in PP (%) | 2.12 | 2.79 | 4.82 |

The results for S6 illustrate the ability to tune the density as well as viscosity of the flooding compound using hollow glass microspheres.

The invention claimed is:

1. A flooding compound for a telecommunications cable, said flooding compound comprising:
   (a) a polymeric filler; and
   (b) a branched olefinic fluid having:
      (i) an average of at least 1.5 methine carbons per oligomer molecule, and
      (ii) at least 40 methine carbons per one thousand total carbons,
   wherein the average number of carbons per molecule in said branched olefinic fluid is from 25 to 200,
   wherein said polymeric filler is a polyolefin elastomer selected from the group consisting of an ethylene-based polyolefin elastomer, a propylene-based polyolefin elastomer, and combinations thereof,
   wherein said polymeric filler is present in an amount ranging from 30 to 50 weight percent, based on the combined weight of said polymeric filler and said branched olefinic fluid;
   wherein said branched olefinic fluid is present in an amount ranging from 50 to 70 weight percent, based on the combined weight of said polymeric filler and said branched olefinic fluid.

2. The flooding compound of claim 1, wherein said flooding compound has an apparent viscosity in the range of from 20 to 400 centipoise at 150° C., as determined according to ASTM D3236, wherein said flooding compound has a drop point of at least 65° C., as determined according to ASTM D127.

3. The flooding compound of claim 1, wherein said branched olefinic fluid is ethylene-based or ethylene- and propylene-based.

4. The flooding compound of claim 1, wherein said branched olefinic fluid is selected from the group consisting of a hyperbranched olefinic fluid prepared from ethylene as the only starting monomer, a branched olefinic fluid prepared from ethylene and propylene as the only starting monomers, a branched olefinic fluid prepared from ethylene and 1-octene as the only starting monomers, and combinations of two or more thereof.

5. The flooding compound of claim 1, wherein said polyolefin elastomer has a crystallinity in the range of 10 to 50 weight percent, wherein said polyolefin elastomer has a dynamic viscosity of 50,000 centipoise or less at 177° C.

6. The flooding compound of claim 1, wherein said polyolefin elastomer has a number-average molecular weight ("Mn") of greater than 5,000 g/mol, wherein said polyolefin elastomer has a weight-average molecular weight ("Mw") in the range of from 5,000 to 50,000 g/mol, wherein said polyolefin elastomer has a polydispersity index ("Mw/Mn") in the range of from 1 to 5, wherein said polyolefin elastomer has a density of less than 0.910 g/cm$^3$, wherein said polyolefin elastomer has a melting point of at least 70° C.

7. The flooding compound of claim 1, further comprising one or more additives selected from the group consisting of antioxidants, rheology modifiers, additional fillers, and stabilizers.

8. The flooding compound of claim 1, wherein said polymeric filler is a propylene-based polyolefin elastomer, wherein said polymeric filler is present in an amount ranging from 40 to 50 weight percent, based on the combined weight of said polymeric filler and said branched olefinic fluid, wherein said branched olefinic fluid is present in an amount ranging from 50 to 60 weight percent, based on the combined weight of said polymeric filler and said branched olefinic fluid, wherein said flooding compound has a minimal loading weight (MLW) of at least 100 g.

9. An optical fiber cable comprising:
   (a) at least one optical fiber;
   (b) a plurality of buffer tubes; and
   (c) the flooding compound of claim 1.

10. The optical fiber cable of claim 9, wherein at least a portion of said flooding compound is disposed within said buffer tubes.

11. A flooding compound for a telecommunications cable, said flooding compound consisting of:
   (a) a polymeric filler;
   (b) a branched olefinic fluid having:
      (i) an average of at least 1.5 methine carbons per oligomer molecule, and
      (ii) at least 40 methine carbons per one thousand total carbons; and
   (c) one or more additives selected from the group consisting of antioxidants, rheology modifiers, additional fillers, and stabilizers;
   wherein the average number of carbons per molecule in said branched olefinic fluid is from 25 to 200,
   wherein said polymeric filler is a polyolefin elastomer selected from the group consisting of an ethylene-based polyolefin elastomer, a propylene-based polyolefin elastomer, and combinations thereof,
   wherein said polymeric filler is present in an amount ranging from 30 to 50 weight percent, based on the combined weight of said polymeric filler and said branched olefinic fluid;
   wherein said branched olefinic fluid is present in an amount ranging from 50 to 70 weight percent, based on the combined weight of said polymeric filler and said branched olefinic fluid.

12. The flooding compound of claim 11, wherein said flooding compound has an apparent viscosity in the range of from 20 to 400 centipoise at 150° C., as determined according to ASTM D3236, wherein said flooding compound has a drop point of at least 65° C., as determined according to ASTM D127.

13. The flooding compound of claim 11, wherein said branched olefinic fluid is selected from the group consisting of a hyperbranched olefinic fluid prepared from ethylene as the only starting monomer, a branched olefinic fluid prepared from ethylene and propylene as the only starting monomers, a branched olefinic fluid prepared from ethylene and 1-octene as the only starting monomers, and combinations of two or more thereof.

14. The flooding compound of claim 11, wherein said polyolefin elastomer has a crystallinity in the range of 10 to less than 50 weight percent, wherein said polyolefin elastomer has a dynamic viscosity of 50,000 centipoise or less at 177° C.

15. The flooding compound of claim 11, wherein said polyolefin elastomer has a number-average molecular weight ("Mn") of greater than 5,000 g/mol; wherein said polyolefin elastomer has a weight-average molecular weight ("Mw") in the range of from 5,000 to 50,000 g/mol, wherein said polyolefin elastomer has a polydispersity index ("Mw/Mn") in the range of from 1 to 5, wherein said polyolefin elastomer has a density of less than 0.910 g/cm$^3$, wherein said polyolefin elastomer has a melting point of at least 70° C.

16. The flooding compound of claim 11, wherein said polymeric filler is a propylene-based polyolefin elastomer, wherein said polymeric filler is present in an amount ranging from 40 to 50 weight percent, based on the combined weight of said polymeric filler and said branched olefinic fluid, wherein said branched olefinic fluid is present in an amount ranging from 50 to 60 weight percent, based on the combined weight of said polymeric filler and said branched olefinic fluid, wherein said flooding compound has a minimal loading weight (MLW) of at least 100 g.

17. An optical fiber cable comprising:
(a) at least one optical fiber;
(b) a plurality of buffer tubes; and
(c) the flooding compound of claim 11.

18. The optical fiber cable of claim 17, wherein at least a portion of said flooding compound is disposed within said buffer tubes.

\* \* \* \* \*